United States Patent [19]

Lukstas

[11] 3,883,723

[45] May 13, 1975

[54] PAPER TAPE READER

[75] Inventor: Edward Lukstas, Windsor, Conn.

[73] Assignee: Varisystems Corporation, Plainview, N.Y.

[22] Filed: Nov. 15, 1973

[21] Appl. No.: 416,112

[52] U.S. Cl. .......................... 235/61.11 E; 178/17 B

[51] Int. Cl. .......................... G06k 7/10; H041 15/18

[58] Field of Search ........... 235/61.11 R, 61.11 E, 235/61.11 A; 178/17 A, 17 B; 197/20; 226/76, 79; 250/555, 566; 200/46

[56] References Cited

UNITED STATES PATENTS

| | | | |
|---|---|---|---|
| 2,377,978 | 6/1945 | Steeneck | 178/17 B |
| 3,387,117 | 6/1968 | Bungard et al. | 235/61.9 R |
| 3,560,717 | 2/1971 | Patterson | 235/61.11 E |
| 3,609,305 | 9/1971 | Davis et al. | 235/61.11 E |

*Primary Examiner*—Daryl W. Cook

*Attorney, Agent, or Firm*—Ostrolenk, Faber, Gerb & Soffen

[57] ABSTRACT

A reader for punch paper tape of either the advanced or regular feed type. The reader is provided with a paper tape guide region through which the paper tape passes. A light emitting diode array is positioned to one side of said guide and a photo electric sensor array is positioned to the opposite side of the guide for detecting light passing through the perforations selectively formed in said paper tape for representing binary data. A paper tape drive is positioned down stream of the sensor array and is comprised of a cylindrical shaped sprocket wheel having sprocket teeth for engaging the punch paper tape drive holes. Cylindrical members extending to either side of the drive teeth cooperate with a spring biased arcuate shaped tape hold down lid having a guide slot for the sprocket teeth to provide frictional engagement between the sprocket wheel assembly and the paper tape to provide driving force therefor even in cases where the tape is torn along the line of drive holes. The hold down member is substantially highly polished along its concave surface to limit the frictional engagement between the paper tape and the hold down lid.

A rotatable guide member positioned at the input of the reader includes detent means for positioning the guide member to receive tape of the six channel advance feed type, eight channel advance feed type and eight channel regular feed type, for example. Cam means cooperating with a switch serves to activate the appropriate positions of the punch hole sensors depending upon the position of the adjustable guide member.

16 Claims, 25 Drawing Figures

PAPER TAPE READER

The present invention relates to readers and more particularly to a novel reader design for use with punch paper tape which may be rapidly adjusted in a simplified manner to receive punch paper tape of differing numbers of channels and which is provided with novel frictional drive means for tape feeding.

BACKGROUND OF THE INVENTION

Punch paper tape readers normally consist of guide means for guiding the punch paper tape into the reader; a reading station for converting the punch holes into electronic signals with the sensing typically being performed through the use of a light source and light sensitive detectors; and a drive assembly for advancing the tape through the reader at a substantially constant rate. It is extremely advantageous for paper tape readers to be provided with the capability of being rapidly adjusted to receive different types of punch paper tapes. For example, three of the most commonly used punch paper tape arrangements are the six channel advance feed type, the eight channel regular feed type and the eight channel advance feed type. Conventional paper tape readers are normally designed to receive only a single type of punch paper tape. In order to adapt such a reader to accommodate a different type of punch paper tape it is necessary to at least partially disassemble the reader and either adjust the feed means, guide means or sensor means, or all three, or replace components of any of the three above sub-assemblies with components specifically designed to accommodate another type of punch paper tape, thereby making such units difficult to use by people without the appropriate level of mechanical skill.

It is also important to provide a paper tape reader capable of feeding paper tape at a substantially constant rate. One of the problems which is typically encountered in punch paper tape is a fraying or tearing of the tape especially in the region of the drive holes. For example, it has been found that conventional paper tape readers are incapable of advancing paper tape in instances where the paper tape has become torn along an imaginary line extending through the center line to the feed holes.

BRIEF DESCRIPTION OF THE INVENTION

The present invention is characterized by providing a novel paper tape reader having means for rapidly and automatically adjusting the tape reader to accommodate various types of punch paper tape without requiring any dismantling of the unit and further comprises a novel tape feed assembly which provides frictional drive means in addition to the sprocket drive means so as to be capable of advancing punch paper tape which has become torn or frayed in the region of the drive holes.

The tape reader of the present invention comprises a mounting assembly having input reading and tape drive positions. The reading comprises closely spaced parallel guides for receiving the paper tape therebetween and having a light array and sendor array positioned on opposite sides of the paper tape and mounted respectively to the separate guide plates for sensing punch holes in the paper tape and converting punch holes into electrical signals.

The input end of the tape reader comprises a rotatably mounted tape guide assembly incorporating a guide plate having slots arranged around its periphery and a plurality of openings arranged at spaced intervals and associated with each slot, said holes being adapted to receive pin extending from a mounting bracket toward said guide plate, said pin cooperating with openings to cooperatively form a dent assembly for locking the guide assembly into the appropriate position. Adjustment of the guide plate is simply and rapidly performed by pulling the guide plate outwardly against a biasing spring to lift the pin from one of the cooperating holes. The guide plate is then rotated to the appropriate position until the pin is aligned with the appropriate hole at which time the guide plate may be released whereby the spring biasing means drives the guide plate into the locked position.

A cam which is mounted for rotation with the guide plate cooperates with a switch assembly for selectively activating only those positions of the reading device which are required for reading the type of punch paper tape to be inputted to the reader.

The tape drive assembly is comprised of a motor driven sprocket assembly having a sprocket wheel mounted upon the motor output shaft. The sprocket teeth are spaced accordingly so as to enter into the punch paper tape drive holes and thereby feed the punch paper tape at a substantially constant rate. Cylindrical members are positioned on opposite sides of the sprocket for frictionally engaging one surface of the punch paper tape. The drive wheel assembly cooperates with a tape hold down member which is spring biased toward engagement with the sprocket assembly and which is further provided with an arcuate shaped free end having a radius of curvature which is just slightly greater than the radius of curvature of the sprocket wheel cylinders so as to make surface engagement with the opposite surface of the punched paper tape. The concave surface of the free end of the hold down member is highly polished to reduce frictional engagement between the punch paper tape. The hold down member is further provided with a guide slot to provide adequate clearance for the unimpeded movement of the sprocket teeth therethrough. The spring biasing means normally urges the hold down member toward the sprocket wheel assembly to maintain good frictional engagement between the sprocket wheel assembly and the punch paper tape, which frictional engagement provides additional advancing or paper feed capability to the tape feed assembly which has been found to be capable of advancing the tape at a constant rate in spite of the fact that the tape feed holes may become frayed, cut or torn along an imaginary line extending between the feed holes of the paper tape so that the feed means is capable of constant paper tape feed velocity in spite of a deterioration in the quality of the punch paper tape being advanced through the reader.

BRIEF DESCRIPTION OF THE FIGURES AND OBJECTS

It is therefore one object of the present invention to provide a novel easily adjustable tape reader capable of reading punch paper tapes of varying types without any need for disassembly of the unit.

Another object of the present invention is to provide a novel combination friction drive and sprocket wheel drive for punch paper tape readers to provide a feed means capable of substantially constant feed velocity in spite of a deterioration in the quality or condition of the punch paper tape being advanced through the reader.

The above as well as other objects of the present invention will become apparent when reading the accompanying description and drawings in which:

FIG. 1*a*–1*c* respectively show three different types of conventional punch paper tape.

FIG. 2*a* shows an elevational view of a tape reader designed in accordance with the principles of the present invention.

FIG. 2*b* shows a top view of a portion of the tape reader assembly of FIG. 2*a*.

FIG. 2*c* shows a front view of the tape reader of FIG. 2*a* with portions of the assembly removed.

FIG. 2*d* shows a front view of the tape reader of FIG. 2*a* showing the rotatable guide assembly in detail.

FIG. 2*e* shows a rear view of the tape reader of FIG. 2*a* showing portions of the tape reader hold down assembly in detail.

FIGS. 3*a* and 3*b* show top and end views respectively of the tape hold down member.

FIGS. 4*a* and 4*b* are top and left-hand end views of the top guide plate employed in the tape reader of FIGS. 2*a*–2*e*.

FIG. 5*a* is a partially sectionized view showing the sprocket wheel assembly of the present invention in greater detail.

FIG. 5*b* shows a detailed view of a portion of the sprocket tooth assembly of FIG. 5*a*.

FIG. 5*c* shows an elevational view of the drive sprocket element in FIG. 5*a*.

FIGS. 6*a*, 6*b* and 6*c* are top, side and right-hand elevational views respectively, of the lower guide plate of FIG. 2*a*.

FIGS. 7*a*, 7*b* and 7*c* are front elevational views of the reader of FIGS. 2*a*–2*e* showing the relationship of the cam, microswitch and adjustable guide member.

FIGS. 8*a* and 8*b* are front and top views showing an alternative tape guide assembly.

FIG. 9 is an elecational view of the cover plate of FIG. 2*c*.

DETAILED DESCRIPTION OF THE FIGURES

Figures 1A, 1B, 1C, 2B:
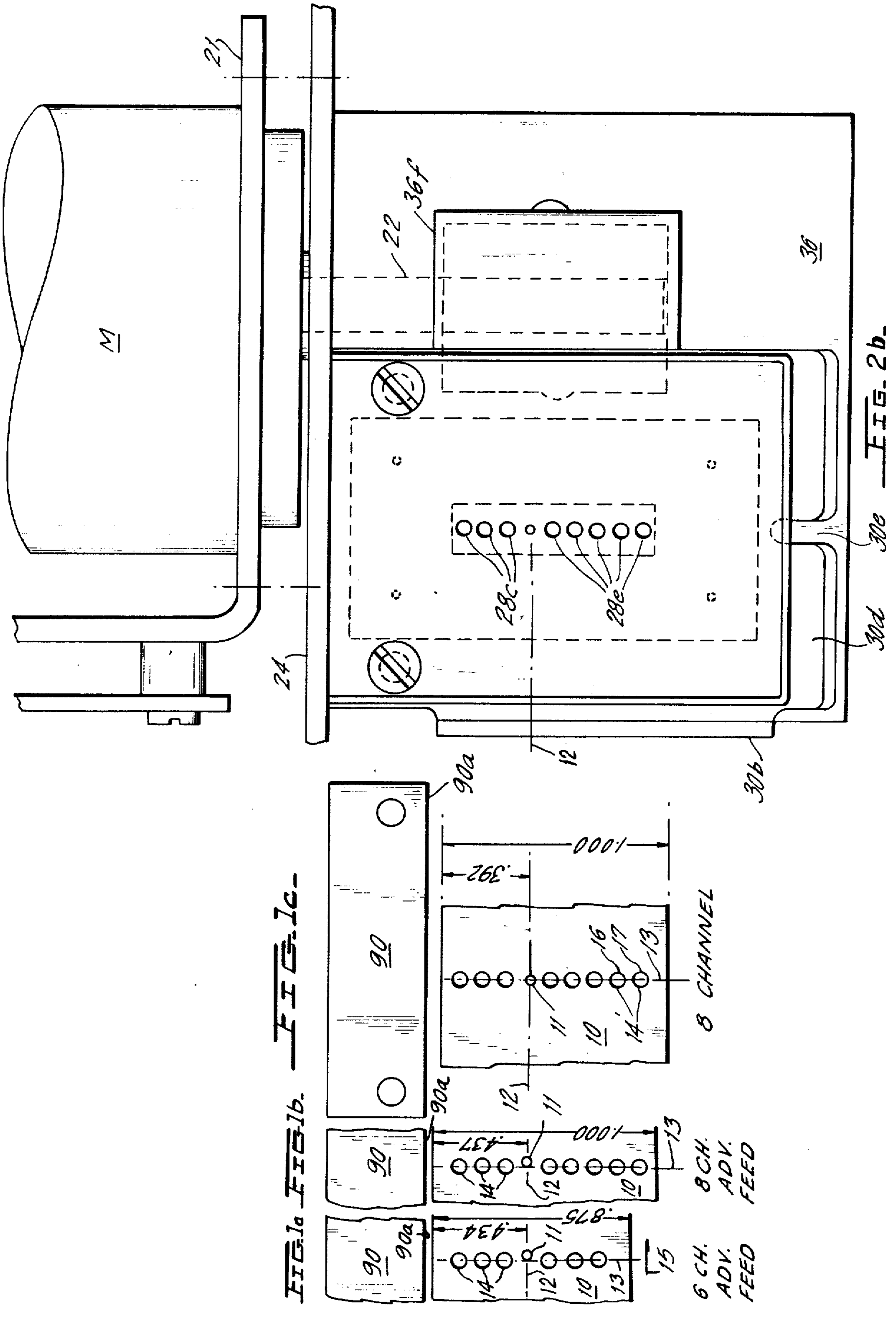

As was set forth hereinabove, there exists a number of different types of punched paper tapes. The most widely used types are the six channel advanced feed type shown in FIG. 1*a;* the eight channel advance feed type shown in FIG. 1*b* and the eight channel regular feed type shown in FIG. 1*c*. The six channel advanced feed type of punch paper tape 10 shown in FIG. 1*a* is typically ⅞ inch in width and is provided with feed holes such as a feed hole 11 aligned along the imaginary longitudinal axis 12 and typically uniformly spaced so that the distance between feed holes from center line to center line is 0.10 inch. The center of feed or drive hole 11 lies slightly to the right of the intersection of imaginary line 12 and imaginary line 13, which lines are mutually perpendicular. Data is stored or punched into the tape by the means of punch holes or perforations 14 whose centers lie along imaginary line 13. The spacing between the data holes and the drive holes is likewise uniform and is typically 0.10 inch. The diameter of the feed holes is of the order of 0.0468 inch while the diameter of the data holes is of the order of 0.072 inch. Each data character is comprised of six binary bits, hence, the name six channel tape. FIG. 1*a* shows a paper tape section having one typical binary coded character in which all channel positions for that character contain a punch hole. It should be obvious that any combination of hole punches is possible yielding a six bit binary code having a total number of sixty four possible binary combinations. The center to center spacing between adjacent coded characters, i.e., between the punch holes of adjacent coded characters is also the order of 0.10 inch. The feed or drive hole 11 can be seen to have its center slightly advanced or down stream from imaginary line 13, arrow 15 designating the direction of paper tape movement, hence the feed or drive hole 11 is slightly advanced relative to the punch data holes, hence the name advanced feed.

FIG. 1*b* shows the typical arrangement for eight channel advanced feed tape, wherein like numerals designate like elements as between FIGS. 1*a* and 1*b*. The only distinction between the arrangement of FIG. 1*b* and FIG. 1*a* is the provision of two additional channels, i.e., the channels which lie along dotted lines 16 and 17 upon which the punched holes 14' are arranged. Again the drive hole 11 is slightly advanced relative to the punched data holes 14 and 14'.

FIG. 1*c* shows an eight channel regular feed, wherein like numerals designate like elements as compared with FIGS. 1*a* and 1*b* and wherein drive hole 11 has its center lying upon the intersection between imaginary line 12 and imaginary line 13, hence the name eight channel regular feed. In all other cases the arrangement of the eight channel regular feed of FIG. 1*c* is identical to the eight channel advanced feed of FIG. 1*b*.

FIGS. 2*a*–2*e* show a tape reader designed in accordance with the principles of the present invention and which is adapted for feeding and reading any of the three types of tapes shown in FIGS. 1*a*–1*c*.

Figure 2A:
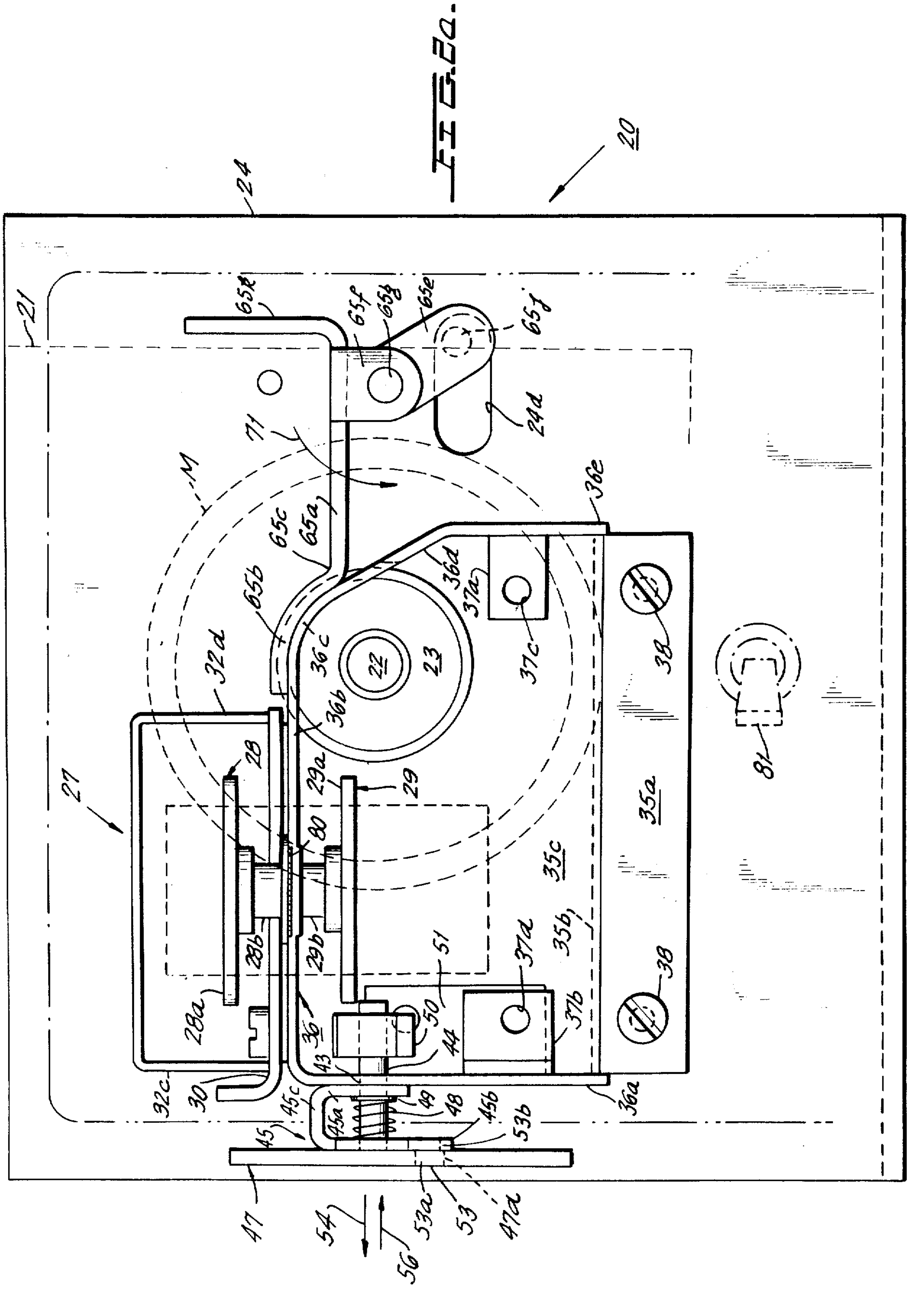

Referring specifically to FIG. 2*a*, the tape reader 20 of the present invention is comprised of an L-shaped bracket 21 having a motor M fixedly secured thereto. Motor M has an output shaft 22 upon which the tape drive sprocket assembly 23 is mounted. The sprocket assembly 23 will be described in more detail hereinbelow in connection with FIGS. 5*a*–5*c*.

Figures 2C, 4A, 4B, 4C:
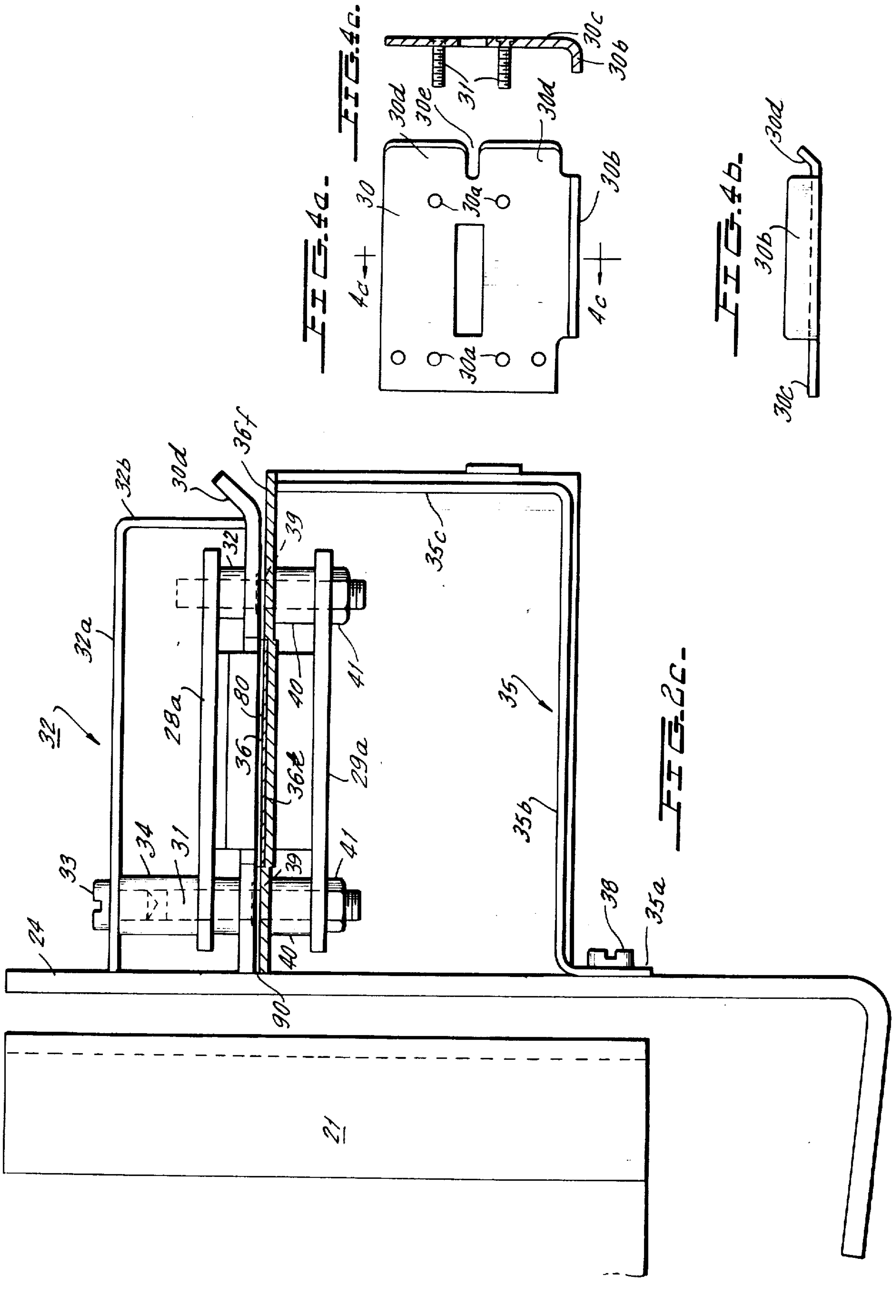

The components of the paper tape reader (excluding motor M) are secured to a second bracket 24 (note especially FIGS. 2*a*, 2*b* and 2*e*) which is secured to the machine frame bracket 31 by fastening members 25. Switch 80, having a manually operable toggle arm 81, is utilized to turn on the device when moved to a first direction and to turn off the device and reset the electronic logic circuitry when moved in the opposite direction. Spacer members 26 are provided to retain members 21 and 24 in spaced parallel arrangement as shown best in FIGS. 2*b*, 2*c* and 2*e*. The reading assembly 27 shown best in FIGS. 2*a*, 2*b* and 2*c* is broadly comprised of an illuminating source assembly 28 and a sensor assembly 29 which will be described in more detail hereinbelow. Briefly however, the source is an illuminating source to provide appropriate illumination for each of the possible punch positions and the feed hole position in a punch paper tape (typically eight punch channels and one feel hole) while the sensing assembly comprises a like number of light sensitive elements each capable of generating a signal when illuminated by a light source which occurs when a punched hole is in alignment with a cooperating light source and photo sensor assigned to that punch position. The source is comprised, for example, of light emitting diodes (LED's)

while the sensors may for example be photo-transistors. One typical source and sensing package which may be used in the present invention is the Fairchild Company's model FPA 100. However, any other suitable source and sensor package of any suitable number of sources and sensors may be employed with equal success.

The source assembly 28 is comprised of a source board 28*a* utilized for mounting the components making up the source package. The LED's are mounted within a block 28*b* and occupy the (nine) discrete positions as shown at 28*c*. The sensor assembly is comprised of a sensor board 29*a* upon which the components of the sensor are mounted with the phototransistors being mounted in the member 29*b*. The phototransistors are positioned beneath the individual LED's and are vertically aligned so as to occupy the same positions as shown at 28*c* of FIG. 2*b*.

Board 28*a* is mounted to a top guide plate 30 shown best in the assembly FIGS. 2*a* and 2*c* and shown in further detail in the top front and sectional views of FIGS. 4*a*–4*c* respectively. The top guide plate is provided with four openings 30*a* for receiving threaded members 31 (two of which are shown in FIGS. 2*c* and 4*c*). These threaded members are arranged to pass through associated openings in source board 28*a* for securing source board 28*a* to top guide plate 30. Spacers 32 are utilized to maintain top guide plate 30 and source board 28*a* in spaced parallel fashion. A spacer 90 (see FIGS. 2*c* and 1*a*–1*c*) is positioned between the upper 30 and lower 36 guide plates. As can best be seen from FIGS. 4*a*–4*c* and 2*a*, top guide plate 30 is provided along one of its sides with an upwardly extending flange 30*b* to facilitate passage beneath the bottom surface 30*c*, of top guide plate 30 of a punch paper tape. A second diagonally aligned flange 30*d* is provided along another side of top guide plate 30 to facilitate entry of a punch paper tape when the punch paper tape is being first installed into the tape reader preparatory to initiation of a tape reading operation. The slot 30*e* provided in flange 30*d* facilitates alignment of a particular row of punch holes in the reader when inserting the tape (see FIGS. 2*b* and 4*a*).

A cover housing 32 is positioned upon the source assembly 28 and comprises a top surface 32*a*, side surface 32*b and front and rear surfaces 32c* and 32*d* respectively. Top cover 32 is secured in position by means of a threaded fastener 33 which threadedly engages an elongated cylindrical threaded member 34 which threadedly engages the upper end of the threaded fastener 31′ (see FIG. 2*c*) as well as threadedly engaging fastener 33. Housing 32 serves to keep the components mounted therein free of dirt and or damage.

Figure 2D:
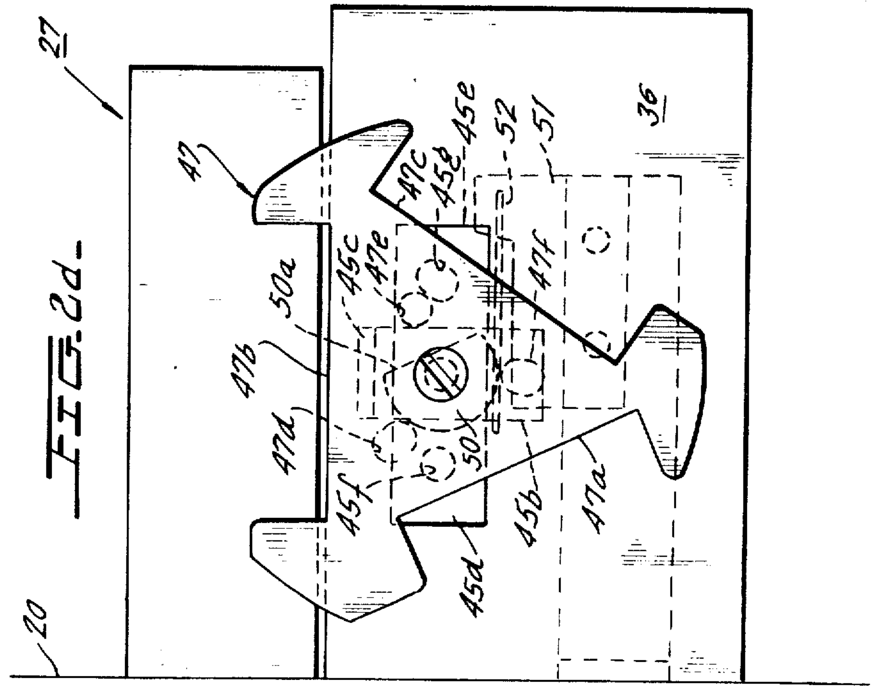

A mounting bracket 36 serves as the bottom guide plate and as a means for positioning and securing the sensor assembly 29 as well as the tape guide assembly shown in FIG. 2*d* and to be more fully described hereinbelow. Bottom guide plate 36 can best be seen in FIGS. 2*a*, 2*c*, and 6*a*–6*c* as being comprised of a downwardly extending flange 36*a* integrally joined to a horizontally aligned guide surface portion 36*b*. The right-hand end of portion 36*b* is bent in an arcuate fashion as shown in 36*c* and thereafter is bent to form a diagonally downwardly extending portion 36*d* which further is bent to form a vertically downwardly extending portion 36*e*. The bottom guide plate 36 is provided with a pair inwardly directed mounting tabs 37*a* and 37*b* which are provided with openings 37*c* and 37*d* respectively for receiving threaded fasteners to pass through openings 37*c* and 37*d* and threadedly engage tapped apertures in plate 24 so as to secure member 36 thereto.

Figure 6C:
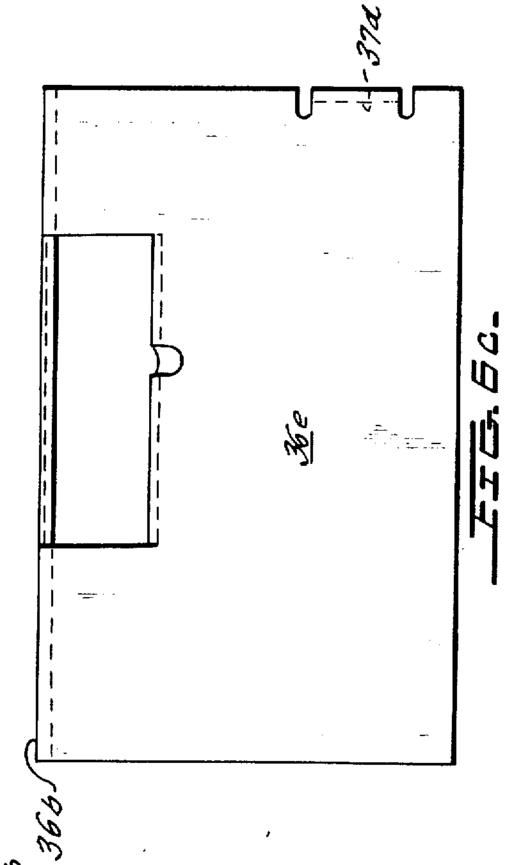
Figure 6A:
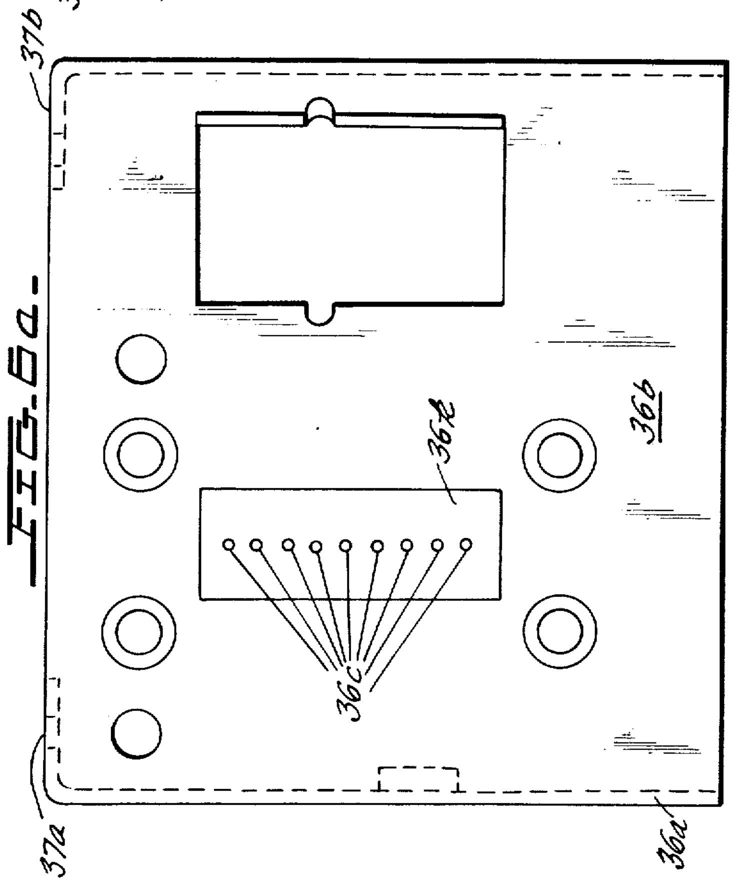
Figure 6B:
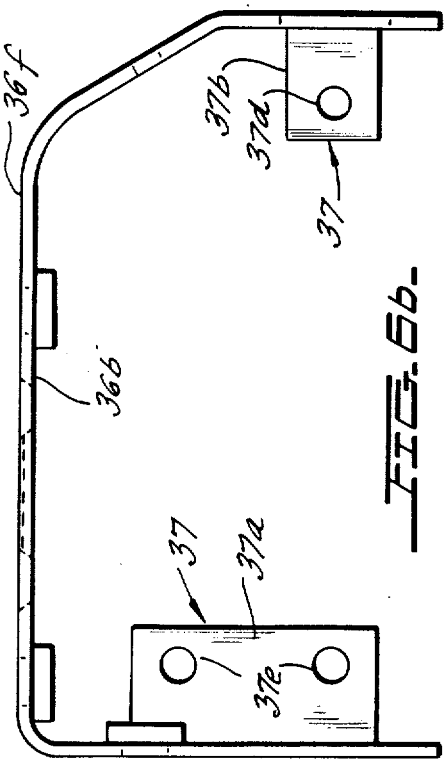
Figure 8B:
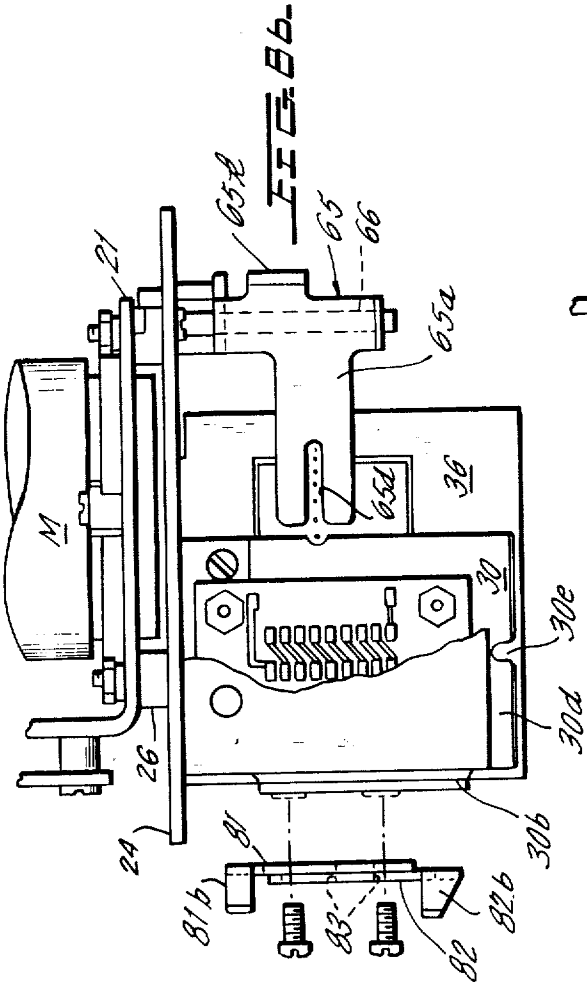
Figure 8A:
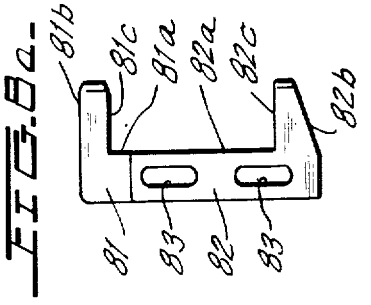

Considering FIGS. 6*a*, and 6*b*, the top surface 36*f* of plate portion 36*b* is provided with a shallow rectangular shaped recess 36*k* length of plate portion 36*b* and having a width at least equal to the widest paper tape member acceptable for reading by the tape reader. The recess 36*k* is adapted to receive a rectangular shaped glass plate 80 having a thickness of the order of 0.010 inches which glass plate serves as a cover for the nine apertures 28*c* provided within recess 36*k* to prevent any dust or other foreign particles from entering holes 28*c* and being deposited on the sensor elements. The glass plate 80 is shown best in FIGS. 2*a* and 2*c*. Tape guide plate portion 36*b* is provided with suitable openings for receiving threaded fasteners 39 for securing the sensor board 29*a* to plate 36. Spacer members 40 are provided for maintaining plate portion 36*b* and sensor board 29*a* in spaced parallel fashion. Nuts 41 secure sensor board 29*a* to fasteners 39.

A cover plate 35 cooperates with member 36 to serve as the cover for enclosing the components contained therein. Plate 35 is comprised of a bottom flange 35*a* secured to plate 24 by fasteners 38. A portion 35*b* integrally joined to flange 35*a* extends outwardly and at a right angle to the flange. Another integrally formed portion 35*c* extends upwardly and at a right angle to portion 35*b*.

The forward or front portion 36*a* of plate 36 is provided with an opening 43 through which shaft 44 extends. A U-shaped member 45 having a first short arm 45*a* and a second long arm 45*b* joined to yoke portion 45*c*, has its arm 45*a* welded or otherwise joined to the front surface of portion 36*a* of lower guide plate 36. Long arm 45*b*, short arm 45*a* and plate portion 36*a* are each provided with openings which are coaligned so as to receive shaft 44 whose central axis CL is coaxial with the centers of the openings in arms 45*a* and 45*b* and plate portion 36*a*. The left-hand end of shaft 44 is secured to a triangular shaped rotatable paper tape guide member 47 so that shaft 44 and tape guide member 47 are caused to rotate in unison. Guide member 47 is provided with three guide slots 47*a*, 47*b* and 47*c* whose widths are designed, in the preferred embodiment described herein, so as to accommodate the punch paper tape of the six channel advance feed, eight channel advance feed and eight channel regular types respectively.

A helical spring 48 is positioned about shaft 44 and has its left-hand portion bearing against the right-hand surface of arm 45*b*. The right-hand end of helical spring 48 bears against a disc shaped washer 49 which is secured to shaft 44 so as to move therewith.

A switching cam member 50 is secured to shaft 44 so as to rotate therewith and is provided with a planar truncated surface 50*a*. Cam 50 rotates with shaft 44 and is designed to cooperate with the actuating arm 52 of a microswitch 51 which serves to selectively actuate two of the eight channel positions of the punch paper tape in a manner to be more fully described.

Rotatable paper tape guide 47 is provided with openings 47*d*–47*f* for receiving a pin 53 whose left-hand end (relative to FIG. 2*a*) is of a first diameter. The right-hand portion 53*b* of pin 53 is of a smaller diameter and is secured within an opening in arm 45*b* of bracket 45.

Pin 53 cooperates with aperatures 47*d*–47*f* so as to function as a detent for releasably locking the guide member 47 in the appropriate tape reading position as will be more fully described.

Arm 45*a* of U-shaped member 45 is provided with two outwardly extending portions 45*d* and 45*e*, each being provided with an opening 45*f* and 45*g* respectively. The lower end of arm 45*b* is also provided with opening 45*h*, the openings 45*f* and 45*g* receiving fasteners to secure bracket 45 to member 36 and opening 45*h* receiving pin 53.

The operation of the tape guide member is as follows:

Depending upon the particular type of punch paper tape which it is desired to insert into the tape reader, the tape guide is positioned so that the tape will be caused to slide over one of the slots 47*a*–47*c* and thereby be accurately positioned and aligned as it enters into the tape reader and passes between the source and sensor elements so that the punch channels will be in alignment with the respective sources and sensors. Let it be assumed that the guide member 47 is in the position shown in FIG. 2*d* and that a six channel advance feed tape is to be inputted into the tape reader. This means that the guide member 47 must be rotated either clockwise or counterclockwise) so that slot 47*a* will occupy the position presently occupied by slot 47*b* in FIG. 2*d*. This is accomplished by pulling the guide member 47 outward in a direction shown by arrow 54 (see FIG. 2*a*) and against the force of biasing spring 48 so as to release pin 53 from opening 47*f*. Once pin 53 is cleared of opening 47*f*, guide member 47 may be rotated clockwise, for example, until tape guide member 47 is nearly in its appropriate position. At this time the guide member may be released thereby enabling biasing spring 48 to urge guide member 47 in the direction shown by arrow 56. Guide member 47 may then be moved by a slight amount sufficient to align opening 47*e* with pin 53 so as to accurately align guide slot 47*a* in the position occupied by guide slot 47*b* in FIG. 2*d*.

It should be noted that, with the guide slot 47*a* in the position presently occupied by guide slot 47*b*, the truncated surface 50*a* of cam 50 will be positioned above the actuating arm 52 of switch 51 causing arm 52 to be in its upward most position. With the microswitch 51 in this state, channel positions "7" and "8" of the LED's and phototransistors are deactivated (i.e., disconnected) from the circuit which energizes these elements. Note FIGS. 1*a* and 1*b* wherein the LED's and photo-transistors utilized to sense the punch channel positions 14' of FIG. 1*b* are deactivated when the tape guide member 47 is positioned in the manner set forth hereinbelow.

Figure 7C:
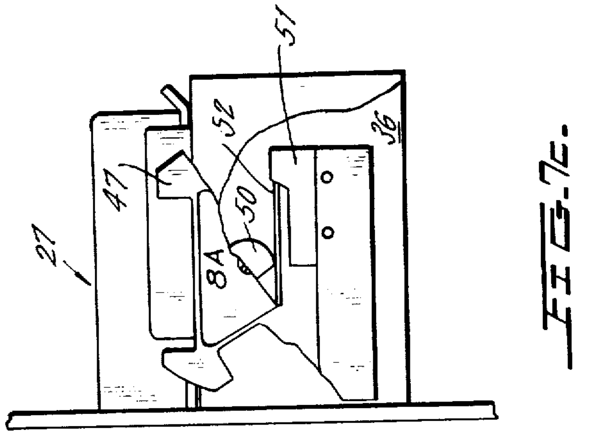
Figure 7B:
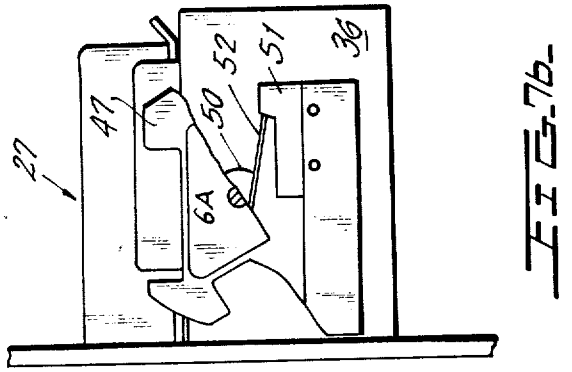
Figure 7A:
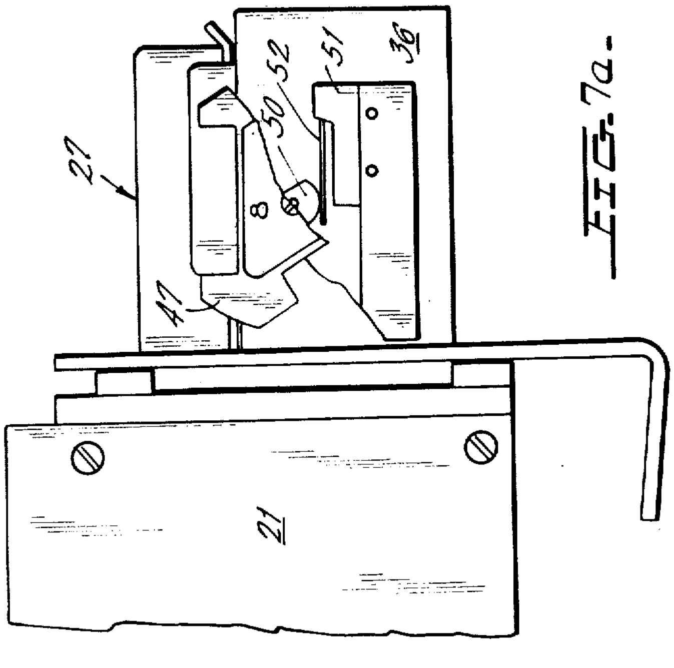

In the remaining two positions, pin 53 is designed to cooperate with openings 47*d* and 47*f* to adapt the tape reader to read and accept eight channel advance feed and eight channel regular tape respectively. In either of these two positions, the circular periphery of cam 90 bears against the actuating arm 52 of microswitch 51 causing it to be urged downwardly and thereby activating (i.e., connecting) the LED's and photo-transistors to the power source so as to permit sensing of the two channel positions 14' as shown, for example, in FIG. 1*b*. FIGS. 7*a*–7*c* show the relationship of the switch arm 52, cam 50 and guide plate 47 for the three respective types of tape channels.

As can best be understood from the appreciation of FIGS. 1*a*–1*c*, it can be seen that slot 47*a*, in the preferred embodiment described herein, is designed to have a width to accommodate the six channel advance feed tape whose width is 0.875 inch.

Whereas the eight channel advance feed and eight channel regular tapes each have a width of 1.0 inches, it can be seen that the sensor line 12 which passes through the center of the feed holes 11 varies in distance from the upper edge of the tape, the distance between center line 12 and the upper edge of the advance feed eight channel tape being 0.437 inch and a distance between center line 12 and the upper edge of the eight channel regular tape being 0.392 inch. Thus, even though the widths of guide slots 47*b* and 47*c* are substantially identical, the guide nevertheless serves to appropriately align the eight channel advance feed and regular tapes (relative to the edge 90*a* of spacer plate 90 so as to be in alignment with the LED's and phototransistors of the source and sensor structures 28 and 29 and further so as to be in alignment with the feed apparatus to be more full described hereinbelow.

The feed means 23 of the tape reader can best be understood from a consideration of FIGS. 2*a*, 2*b*, 2*e*, 3*a*, 3*b* and 5*a*–5*c*.

The lower guide plate 36 is provided with an aperture 36*f* shown best in FIG. 2*b*, through which a portion of the sprocket wheel assembly of the guide feed 23 extends.

Figures 5A, 5B, 5C:
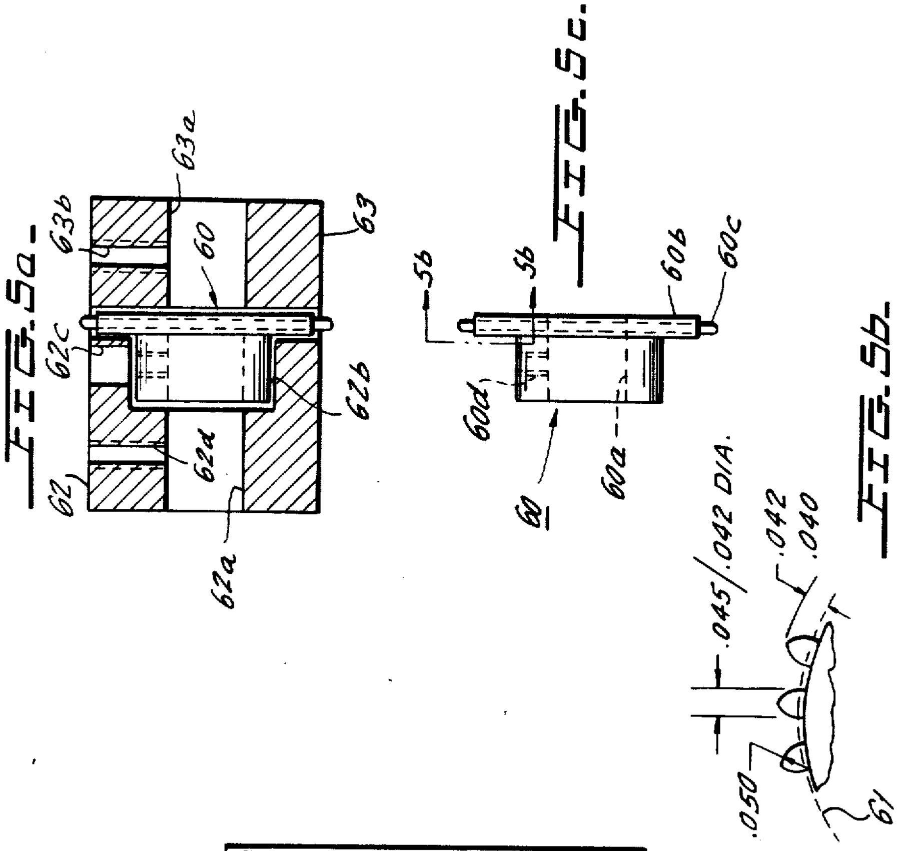

The sprocket wheel assembly is shown best in FIGS. 5*a*–5*c* and is comprised of a drive sprocket member 60 (see FIG. 5*c*) having a central opening 60*a* for receiving motor shaft 22 (see FIGS. 2*a* and 2*b*). The drive sprocket is provided with a flange portion 60*b* having drive teeth 60*c* about its periphery. The configuration of each of the teeth is shown best in FIG. 5*b*. It can be seen that the teeth are tapered so as to be wide at their bases, having a maximum diameter at their bases of the order of 0.045 inch. The theoretical tape riding position of a punch paper tape is shown at 61 in FIG. 5*b*. The distance between the theoretical tape riding diameter and the tip of each of the teeth is in the range from 0.040 to 0.042 inch. The typical diameter of a feed hole is of the order of 0.046 inch so that the paper tape is not driven completely to the bases of the teeth.

Drive sprocket 60 is further provided with a radially aligned tapped opening 60*d* for receiving a set screw (not shown for purposes of simplicity) so as to lock drive sprocket 60 to shaft 22.

The drive assembly is further comprised of first and second sprocket wheel spacers 62 and 63 which are shown best in FIG. 5*a* and are arranged so as to lie respectively to the left and the right of drive sprocket 60. Spacer 63 is arranged so that its left-hand end is positioned adjacent the right-hand end of drive sprocket 60 and is provided with a central opening 63*a* for receiving shaft 22 and with a radially aligned tapped opening 63*b* for receiving a set screw (not shown for purposes of simplicity) for locking spacer 63 to shaft 22.

Spacer 62 is provided with an axially aligned opening 62*a* for receiving shaft 22 and is further provided with an opening 62*b* of enlarged diameter which communicates with opening 62*a* so as to be telescopingly positioned over the main body of drive sprocket 60 in the manner shown in FIG. 5*a*. A radially aligned clearance opening 62*c* is provided in spacer 62 to gain access to the set screw mounted within tapped opening 60*d* of drive sprocket 60. A second radially aligned tapped opening 62*d* is provided for receipt of a set screw (not shown for purposes of simplicity) for securing spacer 62 to shaft 22.

The outer diameter of spacers 62 and 63 are preferably 0.760 inch plus or minus 0.001 inch so as to be of the same diameter as the theoretical tape riding diameter of the tape 61 as shown in FIG. 5b. The drive sprocket and spacers are aligned along shaft 22 so that the centers of the teeth 60c are aligned with the feed hole sensor line 12 shown in FIG. 2b.

A tape hold down lid assembly 65 shown in FIGS. 2a, 2e, 3a and 3b is comprised of a main body portion 65a having a curved free end portion 65b integrally joined thereto at a knee 65c. Curved portion 65b is provided with an elongated slot 65d to provide clearance for the teeth of drive sprocket 60. Extending downwardly from main body portion 65a are a pair of downwardly depending arms 65e and 65f. Shorter arm 65f is provided with an opening 65g which is aligned with an opening 65h in arm 65e so that the center lines of these openings lie along imaginary line 66 shown in FIG. 3a. These openings receive an elongated pivot pin 67 shown best in FIG. 2e. The left-hand end of pin 67 extends through the opening in arm 65f and is provided with a groove (not shown for purposes of simplicity) for receiving a snap fitting locking member 68 which secures the tape hold down lid to shaft 67.

Figures 2E, 3A, 3B:
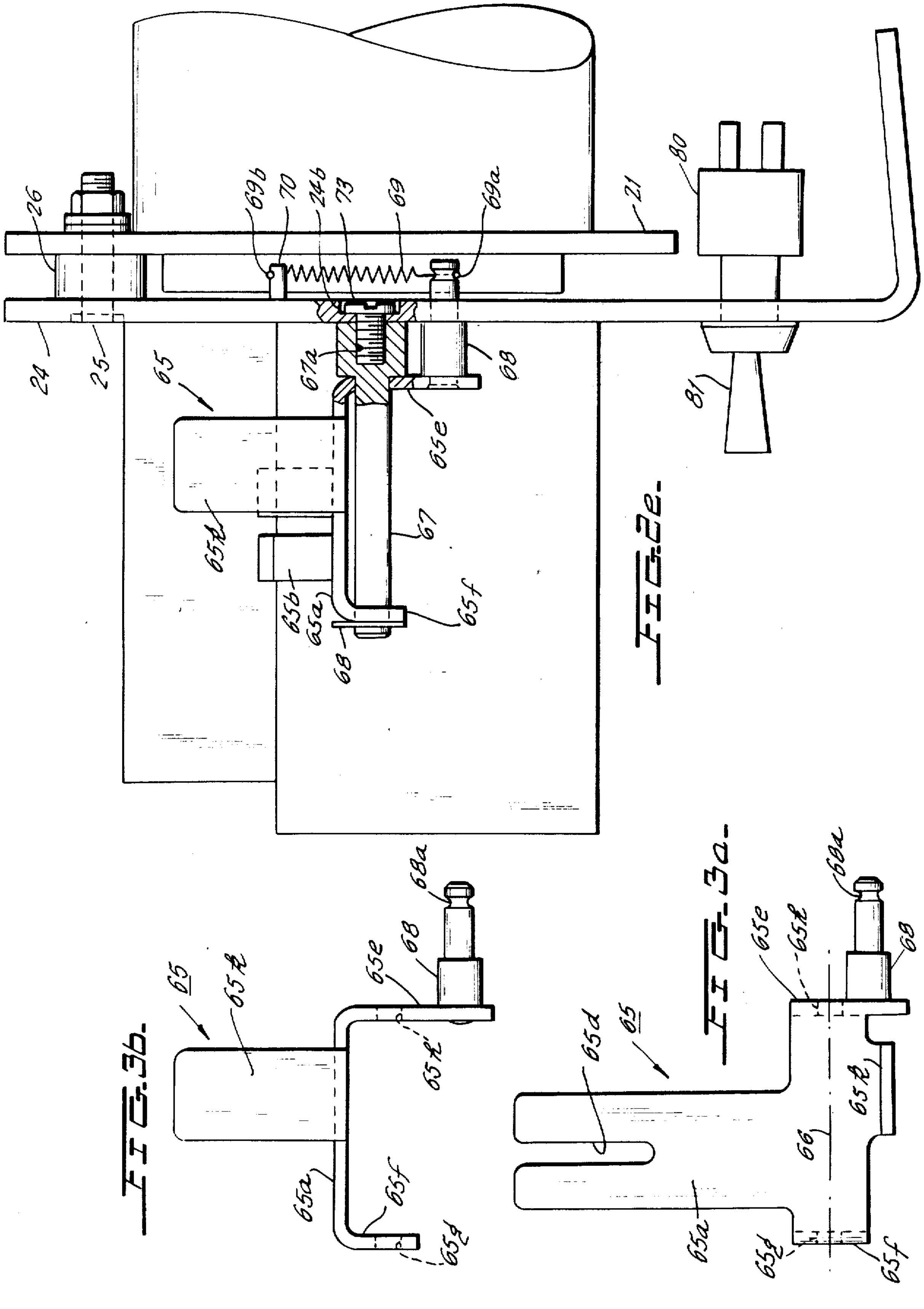
Figure 9:
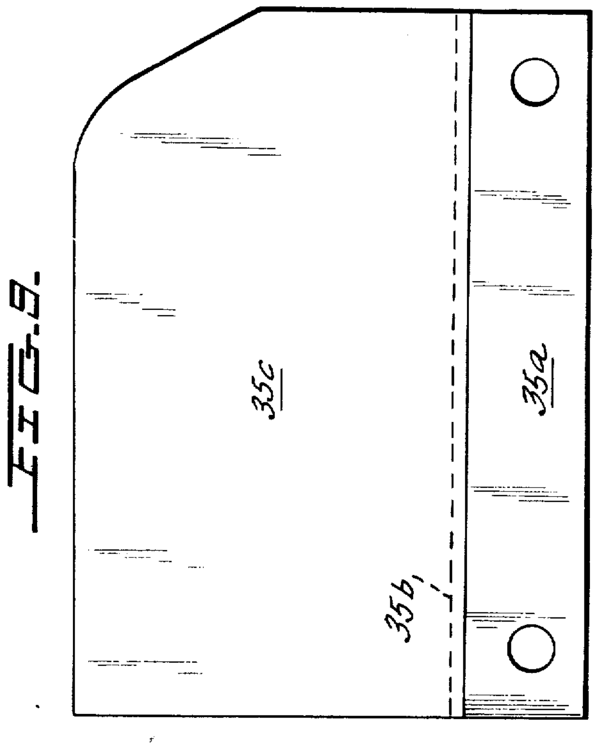

The arm 65e extends diagonally downward below arm 65f and is provided with an opening 65j for force fittingly receiving pin 68 shown best in FIGS. 2e and 3b. Pin 68 extends to the right (relative to FIGS. 3b and 2e) and projects through an elongated clearance slot 24d in mounting plate 24. The right-hand end of pin 68 is provided with a circular groove 68a for receiving one end 69a of a biasing spring 69. The opposite end 69b of spring 69 is fitted within a groove provided in pin 70 mounted to plate 24. Biasing spring 69 exerts a counterclockwise biasing force about pivot pin 67 (relative to FIG. 2a) so as to urge the tape hold down lid 65 in the counterclockwise direction as shown by arrows 70 in FIG. 2a.

Pivot pin 67 has an enlarged diameter portion 67a with a threaded tapped opening which threadedly engages a threaded fastener 73 to rigidly secure shaft 67 to mounting plate 24. Fastening member 73 has its head arranged flush with the right-hand surface of mounting plate 24 by virtue of a recess 24b provided in plate 24.

The right-hand end of tape hold down lid 65 is further provided with an upwardly extending flange 65k which is arranged to be gripped by the fingers of an operator in order to permit the tape hold down lid to be rotated clockwise against the force of biasing spring 69 so as to lift the curved portion 65b thereof upward and away from the drive sprocket assembly for paper tape loading and/or unloading purposes.

Loading of a punch paper tape is performed in the following fashion:

The adjustment of the tape guide member is performed initially in the manner set forth hereinabove. One side of the lead end of the punch paper tape is inserted between the diagonally aligned flange 30d of top guide plate 30 and the upper surface of bottom guide plate 36 (note especially FIGS. 2b and 2c). The portion of the punch paper tape which extends to the left of tape guide member 47 is positoned over the guide slot. The extreme right-hand end of the paper tape may then be moved in the right-hand direction relative of FIG. 2a so that it extends slightly beyond and to the right of the drive sprocket assembly.

By gripping the flange 65k the tape hold down lid 65 may be rotated counterclockwise so that its arcuate portion 65b is lifted upwardly and away from the drive sprocket assembly. The tape may then be laid down upon the drive sprocket assembly with the feed holes in alignment with the drive teeth. The tape hold down lid 65 may then be released causing biasing spring 69 to urge the tape hold down lid counterclockwise thereby pressing the punch paper tape downwardly so that selected ones of the feed holes are pressed downwardly upon the associated teeth 60c and so that the surface of the punch paper tape engages the cylindrical surfaces of the spacer members 62 and 63. The outer diameters of the cylindrical surfaces of the spacer members act to cause the paper tape to occupy the theoretical tape riding diameter as shown in FIG. 5b.

In one preferred embodiment, the drive sprocket 60 is formed of metal such as for example, stainless steel while the spacer members 62 and 63 are formed of nylon. The cylindrical surfaces of the spacer members are smooth and the concave surface of the curved portion 65b of the tape hold down lid 65 is polished smooth.

The spring biasing member 69 serves to urge the tape hold down lid against the punch paper tape sandwiched between the curved portion 65b and the drive sprocket assembly. The highly polished concave surfcace of curved portion 65b serves to minimize the frictional engagement between the punch paper tape and the tape hold down lid. However, the frictional engagement between the punch paper tape and the spacer members 62 and 63 cooperatively functions to assist in the feed of the paper tape. This arrangement has been found to be of extreme value especially in cases where the tape has become torn. Tests have been performed wherein the punch paper tape has been slit along center line 12 over linear lengths of as great as 1 to 2 inches. In spite of this multilation, the frictional drive between the rotating spacer members 62 and 63 and the paper tape 61 has been found to be sufficient to assure positive accurate drive of the punch paper tape during the tape reading operation. In applications wherein higher speeds are desired it is preferred that plastic spacers be employed since the plastic spacers have less inertia. However, spacers 62 and 63 formed of metal can be employed in embodiments operating at lower feed speeds.

It should be noted that there is no gap between the top surfaces of the punch paper tape and the concave surface of the tape hold down guide, assuring that the sprocket teeth enter into the drive holes to the exact desired depth (controlled by the diameters of the spacer members 62 and 63) so that the drive holes do not become torn or widened. The frictional engagement between the spacers and the underside of the punch paper tape provides sufficient frictional drive to assist the sprocket drive which is contrary to conventional designs which employ two stationary guides and a drive sprocket without spacers with the teeth of the drive sprocket extending through the guide slots of the two guides. With this arrangement it is not possible to use a spring loading technique since the spring loading would cause the guides to be urged toward one another and to function as a breaking means. The concave polished surface of the tape hold down lid curved portion 65b minimizes frictional drive between the punch paper tape and the tape hold down lid. Also, due to the greater curvature of curved portion **65*b* relative to the diameters of spacers 62 and 63, the surface contact between the concave surface of curve portion 65*b* and paper tape 61 is significantly less than the entire surface area of curve portion 65*b* whereas there is a large surface area of contact between the punch paper tape and the spacers 62 and 63**.

The novel arrangement of the present invention thereby prevents widening or tearing of the feed holes thereby significantly increasing the useful operation life of punch paper tape.

The guide slots in rotatable tape guide member 47 cooperate with the drive sprocket to exactly align the punch paper tape channels with the LED sources and the photo-transistor sensor to assure appropriate alignment of the punch paper tape for reading purposes.

The narrow gap between the bottom surface of the top guide plate and plate 80 positioned in the recess in bottom guide plate 36 arranged in the read station as well as the gap between the guide plates cooperates to provide a wiping action to keep the read station area clean by virtue of the fact that the tape "wipes" the reading area as it is being fed.

Feeding is performed by motor M which is preferably a stepping motor operated by sequentially pulsing each of its three phases and then simultaneously pulsing all three phases for a breaking action as the tape is just about in the reading position.

Another tape guiding assembly is shown in FIGS. **8*a* and 8*b* and id comprised of a pair of plates 81 and 82 each having a pair of elongated slots 83 arranged to receive fasteners 84 to secure the plates 81 and 82 to member 36 in place of bracket 45 and guide plate 47, plates 81 and 82 each have an edge 81*a* and 82*a* which edtes are coplanar. Plates 81 and 82 further include upward extending projections 81*b* and 82*b* whose facing edges 81*c* and 82*c* may be positioned relative to one another by a distance substantially equivalent to the width of the paper tape to be read by the reader. The elongated slots 83 serve to allow a broad range of adjustment of plates 81 and 82**.

Although the present invention has been described in connection with a preferred embodiment thereof, many variations and modifications will now become apparent to those skilled in the art. For example, the rotatable guide 47 and the drive 23 may be employed with equal success in tape punchers. Also the bracket 45 may be provided with apertures and the guide plate 47 may be provided with pin 53 thereby reversing the elements forming the detent assembly. It is preferred, therefore, that the present invention be limited not by the specific disclosure herein, but only by the appended claims.

What is claimed is:

1. Guide means for a paper tape reader adapted to accommodate tapes of differing hole patterns and/or tape widths comprising:
   - first and second spaced parallel tape guide plates for receiving and guiding a punched paper tape therebetween;
   - a tape reader comprising:
   - a light source assembly mounted upon said first plate;
   - a sensor assembly mounted upon said second plate and having a sensor means at each channel position of the tape adapted to generate a pulse when illuminated by the source assembly;

- a paper tape guide member rotatably mounted to the input end of one of said guide plates;
   - said guide member having a plurality of guide slots arranged about the periphery of the guide member, the size and position of each of said slots being adapted to receive a particular punch tape;
   - each of said slots being adapted to be selectively positioned into alignment with the guide surface of one of said guide plates to align the channels of the tape passing over the slot with the source and sensor assemblies.

2. The apparatus of claim 1 further comprising cam means mechanically linked to said rotatable guide member;
   - switch means having a switch arm;
   - said cam member being adapted to move said switch arm to either a first or a second position dependent upon the angular position of said guide member;
   - said switch means being adapted to disable selected ones of said sensors when said switch arm is in a first position and being adapted to place said selected ones of said sensor in operative condition when said switch arm is in said second position.

3. The apparatus of claim 1 further comprising releasable detent means for locking the rotatable guide member into position 4. The apparatus of claim 3, wherein said detent means comprises:
   - a bracket secured to one of said guide plates;
   - said guide plate having a pin extending toward said bracket;
   - said bracket having an arm positioned adjacent said rotatable guide member;
   - said arm having a plurality of apertures equal in number to the number of guide slots and each adapted to selectively receive said pin when each of said guide slots in said rotatable guide member is aligned with the guide plate to lock said rotatable guide member in position.

5. The apparatus of claim 4 further including a shaft extending through said bracket;
   - said rotatable guide member being secured to one end of said shaft;
   - said shaft having a projection;
   - spring biasing means being positioned between said bracket arm and projection for normally urging said guide member toward said arm so as to maintain said pin in one of said apertures;
   - said guide member being movable in a direction opposite the biasing force of said biasing means to release said pin from the apertures to enable repositioning of the guide member.

6. The apparatus of claim 5, wherein said bracket is a U-shaped bracket having a second arm secured to said one of said guide plates;
   - said shaft projection comprising a circular shaped disc secured to said shaft and positioned between the arms of said bracket;
   - said biasing means comprising a helical spring positioned about said shaft and having first and second ends respectively abutting said first arm and said disc.

7. The apparatus of claim 3, wherein said detent means comprises:
   - a bracket secured to one of said guide plates;
   - said guide plate having a plurality of openings each associated with one of said slots;

said bracket having an arm positioned adjacent said rotatable guide member;

said arm having a pin secured thereto and extending toward said guide member and adapted to be selectively received by one of said openings when each of said guide slots in said rotatable guide member is aligned with the guide plate to lock said rotatable guide member in position.

8. Feed means for punch paper tape reading or punching devices adapted to feed tape having feed holes comprising:

a motor;

a rotatable drive shaft operated by said rotor;

a drive sprocket assembly mounted upon said shaft, said assembly comprising a drive sprocket having drive teeth arranged in spaced fashion about the periphery of said drive sprocket;

first and second cylindrical members being mounted upon said drive shaft and positioned on opposite sides of said drive sprocket;

a swingably mounted tape hold down member;

a pin for swingably mounting a first end of said hold down member remote from said drive sprocket assembly;

the opposite end of said member having a curved contour generally conforming to the shape of said cylindrical members;

biasing means for normally urging said hold down member in a first direction to urge said curved end toward said drive sprocket assembly;

the teeth of said sprocket assembly extending beyond the peripheries of said cylindrical members;

the curved end of said hold down member having an elongated slot to provide clearance for said sprocket teeth;

said drive sprocket assembly and said hold down member curved end being adapted to receive a punch paper tape therebetween;

said sprocket teeth being adapted to enter the feed holes of the paper tape and thereby advance the tape through said device;

said biasing means being adapted to urge said hold down member against said tape to provide frictional engagement between said tape and said cylindrical members which frictional engagement facilitates the driving action of the feed means upon the tape.

9. The feed means of claim 8, wherein the concave surface of the curved portion of said hold down member is polished to minimize frictional engagement between the hold down member and the paper tape.

10. The feed means of claim 8, wherein the sides of said teeth are curved and taper to a point at the free ends thereof;

the diameter at the base of each of the teeth being substantially equal to the diameter of the tape feed holes;

the diameters of said cylindrical members being adapted to cause the paper tape to ride slightly above the bases of the teeth to prevent tearing or enlargement of the feed holes.

11. The feed means of claim 8, wherein said hold down member is provided with first and second arms both extending outwardly from said first end;

each of said arms having an opening for receiving said pin.

12. The feed members of claim 11, wherein said first arm is longer than said second arm;

the free end of said first arm having a projecting pin;

said biasing means being secured to said projecting pin for urging said hold down member toward said drive sprocket assembly.

13. The feed means of claim 12, wherein said hold down member is further provided with a third arm extending in a direction opposite said first and second arms for swinging said hold down member away from the drive sprocket assembly for inserting a paper tape into the feed means.

14. Guide means for a paper tape reader adapted to accommodate tapes of differing hole patterns and/or tape widths comprising:

first and second spaced parallel tape guide plates for receiving and guiding a punched paper tape therebetween;

a tape reader comprising:

a light source assembly mounted upon said first plate;

a sensor assembly mounted upon said second plate and having a sensor means at each channel position of the tape adapted to generate a pulse when illuminated by the source assembly;

a paper tape guide member rotatably mounted to the input end of one of said guide plates;

said guide member having a plurality of guide slots arranged about the periphery of the guide member, the size and position of each of said slots being adapted to receive a particular punch tape;

each of said slots being adapted to be selectively positioned into alignment with the guide surface of one of said guide plates to align the channels of the tape passing over the slot with the source and sensor assemblies;

feed means for advancing the tape through said reader comprising:

a motor;

a rotatable drive shaft operated by said motor;

a drive sprocket assembly mounted upon said shaft, said assembly comprising a drive sprocket having drive teeth arranged in spaced fashion about the periphery of said drive sprocket;

first and second cylindrical members being mounted upon said drive shaft and positioned on opposite sides of said drive sprocket;

a swingably mounted tape hold down member;

a pin for swingably mounting a first end of said hold down member remote from said drive sprocket assembly;

the opposite end of said member having a curved contour generally conforming to the shape of said cylindrical members;

biasing means for normally urging said hold down member in a first direction to urge said curved end toward said drive sprocket assembly;

the teeth of said sprocket assembly extending beyond the peripheries of said cylindrical members;

the curved end of said hold down member having an elongated slot to provide clearance for said sprocket teeth;

said drive sprocket assembly and said hold down member curved end being adapted to receive a punch paper tape therebetween;

said sprocket teeth being adapted to enter the feed holes of the paper tape and thereby advance the tape through said device;

said biasing means being adapted to urge said hold down member against said tape to provide frictional engagement between said tape and said cylindrical members which frictional engagement facilitates the driving action of the feed means upon the tape.

15. Guide means for a paper tape reader adapted to accommodate tapes of differing hole patterns and/or tape widths comprising:

first and second spaced parallel tape guide plates for receiving and guiding a punched paper tape therebetween;

a tape reader comprising:

a light source assembly mounted upon said first plate;

a sensor assembly mounted upon said second plate and having a sensor means at each channel position of the tape adapted to generate a pulse when illuminated by the source assembly;

a paper tape guide assembly movably mounted to the input end of one of said guide plates;

said guide assembly having an adjustable guide slot adapted to receive punch tapes of varying width;

said adjustable guide slot being positioned in alignment with the guide surface of one of said guide plates to align the channels of the tape passing over the slot with the source and sendor assemblies.

16. The apparatus of claim 15 wherein said tape guide assembly comprises first and second L-shaped plates each having at least one elongated opening;

fastening means passing through said openings for securing said L-shaped plates to said guide plate;

said L-shaped plates being arranged one upon the other to cooperatively form a guide slot for receiving and guiding a paper tape whereby the elongated slots enable the guide slot width to be adjusted to receive paper tapes of varying width.

* * * * *